United States Patent
Ribarov et al.

(10) Patent No.: US 10,828,518 B2
(45) Date of Patent: Nov. 10, 2020

(54) INTEGRATED CARGO FIRE SUPPRESSION AND INERTING SYSTEM

(71) Applicant: Kidde Technologies, Inc., Wilson, NC (US)

(72) Inventors: Lubomir A. Ribarov, West Hartford, CT (US); Dharmendr Len Seebaluck, Wake Forest, NC (US)

(73) Assignee: Kidde Technologies, Inc., Wilson, NC (US)

( * ) Notice: Subject to any disclaimer, the term of this patent is extended or adjusted under 35 U.S.C. 154(b) by 0 days.

(21) Appl. No.: 15/934,429

(22) Filed: Mar. 23, 2018

(65) Prior Publication Data

US 2019/0290946 A1    Sep. 26, 2019

(51) Int. Cl.
| | |
|---|---|
| *A62C 3/08* | (2006.01) |
| *A62C 5/00* | (2006.01) |
| *A62C 99/00* | (2010.01) |
| *B64D 41/00* | (2006.01) |

(52) U.S. Cl.
CPC ............... *A62C 3/08* (2013.01); *A62C 5/008* (2013.01); *A62C 99/0018* (2013.01); *A62C 99/0072* (2013.01); *A62C 5/002* (2013.01); *B64D 2041/002* (2013.01)

(58) Field of Classification Search
CPC ... A62C 3/08; A62C 99/0072; A62C 99/0018; A62C 5/008; A62C 5/002; B64D 2041/002
See application file for complete search history.

(56) References Cited

U.S. PATENT DOCUMENTS

| | | | | |
|---|---|---|---|---|
| 5,848,652 | A | * | 12/1998 | Bennett .................... A62C 3/07 169/62 |
| 9,102,416 | B1 | | 8/2015 | Cutler |
| 9,731,834 | B2 | | 8/2017 | Hagh et al. |
| 2004/0168992 | A1 | * | 9/2004 | Ben-Amotz .............. E03B 1/04 210/805 |
| 2005/0173131 | A1 | * | 8/2005 | Dunster ................... A62C 5/00 169/44 |
| 2008/0168798 | A1 | | 7/2008 | Kotliar |
| 2011/0094205 | A1 | | 4/2011 | Rehling |

(Continued)

FOREIGN PATENT DOCUMENTS

| | | |
|---|---|---|
| EP | 2624353 A1 | 8/2013 |
| EP | 2824744 A1 | 1/2015 |
| GB | 2262444 A | 6/1993 |

OTHER PUBLICATIONS

U.S. Department of Transportation Federal Aviation Administration Advisory Circular—Built-in Fire Extinguishing/Suppression Systems in Class C and Class F Cargo Compartments, Feb. 3, 2016, AC No. 25.851-1, 26 pages.

(Continued)

*Primary Examiner* — Qingzhang Zhou
(74) *Attorney, Agent, or Firm* — Kinney & Lange, P.A.

(57) ABSTRACT

An integrated fire suppression system receives inert gas from onboard gas generators and water effluent from onboard water generators. The inert gas and water effluent are mixed in a gas-water mixer to generate an inert aerosol. The inert aerosol is provided to a fire suppressant distribution network and sprayed into areas of the aircraft requiring fire suppression to provide cooling and to prevent reignition.

17 Claims, 2 Drawing Sheets

(56) References Cited

U.S. PATENT DOCUMENTS

| | | | |
|---|---|---|---|
| 2013/0000927 A1 | 1/2013 | Meier et al. | |
| 2014/0290967 A1* | 10/2014 | Kim | A62C 35/68 |
| | | | 169/13 |
| 2015/0075823 A1* | 3/2015 | Meier | A62C 35/023 |
| | | | 169/46 |
| 2016/0030781 A1 | 2/2016 | Hoff et al. | |
| 2016/0096051 A1* | 4/2016 | Baker | A62C 3/08 |
| | | | 169/46 |
| 2016/0118679 A1 | 4/2016 | Joos et al. | |
| 2016/0236024 A1 | 8/2016 | Hopfe et al. | |
| 2016/0362191 A1 | 12/2016 | Jann Claus Hoff | |
| 2018/0001124 A1* | 1/2018 | Klassen | A62C 3/08 |

OTHER PUBLICATIONS

Extended European Search Report for EP Application No. 19164015.0, dated Jul. 23, 2019, Pages 9.

\* cited by examiner

```
                                              100
                                               ↙

┌──────────────────────────────────────────────┐
    │  COLLECTING CONDITIONED WATER FROM AT LEAST  │──102
    │    ONE ONBOARD WATER GENERATING SYSTEM       │
    └──────────────────────────────────────────────┘
                          │
                          ▼
    ┌──────────────────────────────────────────────┐
    │       FLOWING THE CONDITIONED WATER          │──104
    │           TO A GAS-WATER MIXER               │
    └──────────────────────────────────────────────┘
                          │
                          ▼
    ┌──────────────────────────────────────────────┐
    │   FLOWING INERT GAS FROM TO THE GAS-         │
    │  WATER MIXER VIA AN INERT GAS LINE TO        │──106
    │       GENERATE AN INERT AEROSOL              │
    └──────────────────────────────────────────────┘
                          │
                          ▼
    ┌──────────────────────────────────────────────┐
    │  FEEDING THE INERT AEROSOL TO A FIRE         │
    │  SUPPRESSING DISTRIBUTION NETWORK AND        │──108
    │  APPLYING THE INERT AEROSOL TO AN AREA OF    │
    │  THE AIRCRAFT REQUIRING FIRE SUPPRESSION     │
    └──────────────────────────────────────────────┘
```

Fig. 2

INTEGRATED CARGO FIRE SUPPRESSION AND INERTING SYSTEM

BACKGROUND

This disclosure relates generally to fire suppression systems. More particularly, this disclosure relates to onboard fire suppression systems for aircraft.

Fire suppression systems onboard aircraft include both high-rate discharge and metered/low-rate discharge systems. The high-rate discharge systems provide initial fire suppression knock down, while the metered/low-rate discharge systems prevent reignition by maintaining at least the required minimum halon concentration in the cargo bay. Both the high-rate discharge Fire Extinguisher and metered/low-rate discharge Fire Extinguisher are line replaceable units that are dedicated to fire suppression. The fire suppressants utilized by both the high-rate discharge and metered/low-rate discharge systems can include environmentally hazardous materials, such as Halon-1301. In addition, other systems onboard the aircraft generate waste effluents, both gaseous and liquid, that are vented overboard or disposed of in another manner.

SUMMARY

According to one aspect of the disclosure, a fire suppression system includes a water supply system configured to collect conditioned water effluent from at least one onboard water source; a gas generation system configured to provide a supply of inert gas to an inert flow line; a gas-water mixer disposed downstream of the water supply system and the gas generation system, the gas-water mixer configured to receive the conditioned water effluent and the supply of inert gas and to generate an inert aerosol; and a fire suppressant distribution network disposed downstream of the gas-water mixer, the fire suppressant distribution network configured to provide the inert aerosol to areas of an aircraft.

According to another aspect of the disclosure, a method of providing fire suppression capabilities for an aircraft includes collecting conditioned water from at least one onboard water generating system of the aircraft; directing the conditioned water to an inert gas-water mixer; directing an inert gas to the inert gas-water mixer via an inert flow line, thereby generating an inert aerosol; and feeding the inert aerosol to a fire suppressant distribution network and directing the inert aerosol to an affected area of the aircraft for fire suppression.

BRIEF DESCRIPTION OF THE DRAWINGS

FIG. 2 is a flow chart illustrating a method of fire suppression for an aircraft.

DETAILED DESCRIPTION

Figure 1:
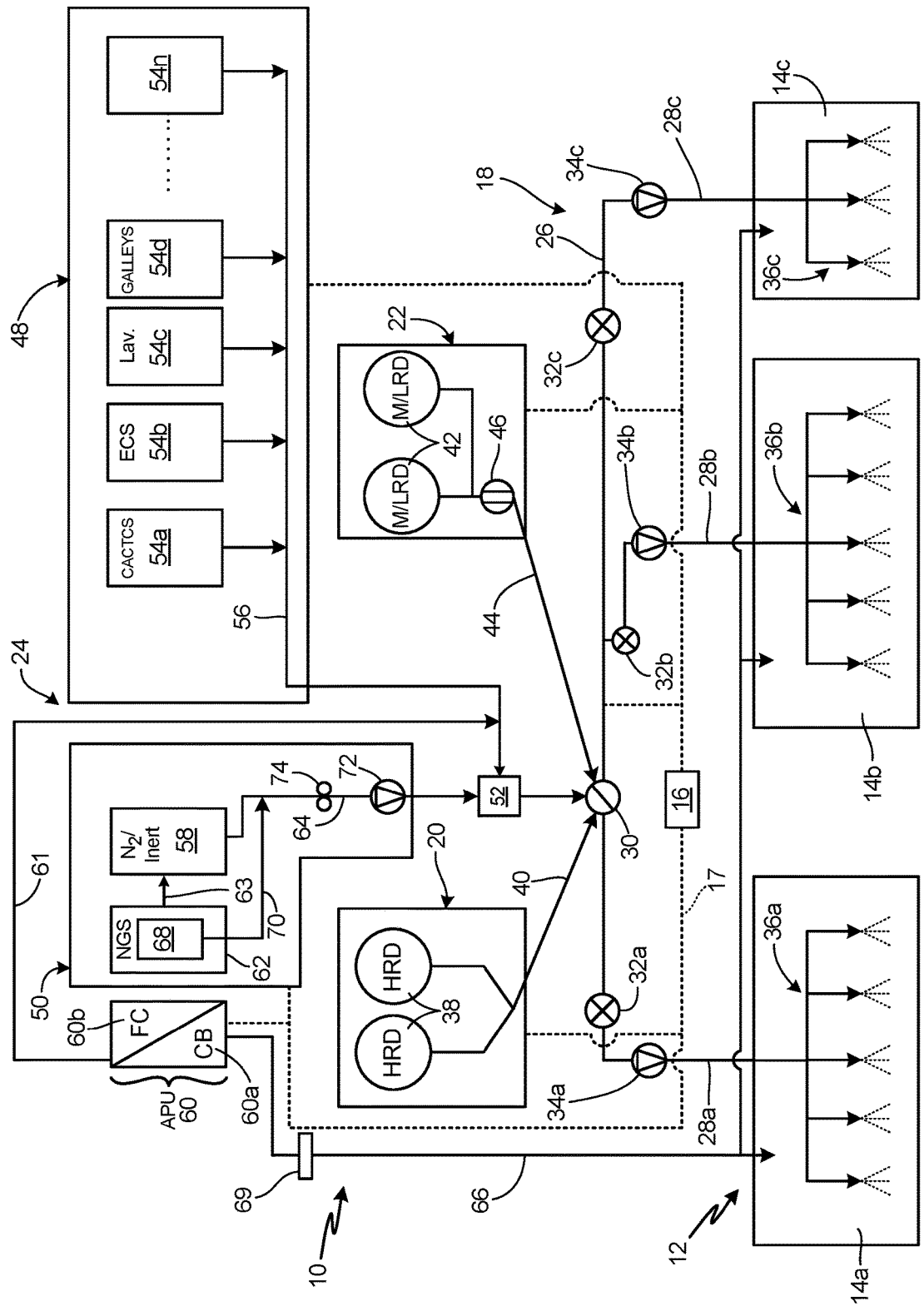
FIG. 1 is a schematic diagram of a fire suppression system for an aircraft.

FIG. 1 is a schematic diagram of fire suppression system 10 for an aircraft 12. Aircraft 12 includes cargo holds 14a-14c (collectively herein "cargo holds 14"). Fire suppression system 10 includes controller 16, communication network 17, distribution network 18, high-rate discharge (HRD) module 20, metered/low-rate discharge (M/LRD) module 22, and integrated suppression system 24. M/LRD module 22 is configured to provide low-rate discharge ("LRD") fire suppression capabilities. Distribution network 18 includes distribution line 26, supply lines 28a-28c (collectively herein "supply lines 28"), mixing valve 30, shut-off valves 32a-32c (collectively herein "shut-off valves 32"), check valves 34a-34c (collectively herein "check valves 34"), spray nozzles 36a-36c (collectively herein "spray nozzles 36"). HRD module 20 includes HRD vessels 38 and HRD supply line 40. M/LRD module 22 includes M/LRD supply vessels 42, M/LRD supply line 44 and metering valve 46. Integrated suppression system 24 includes water supply 48, inert gas supply 50, gas-water mixer 52, and auxiliary power unit 60. Water supply 48 includes onboard water generators 54a-54n (collectively herein "onboard water generators 54") and water supply line 56. Inert gas supply 50 includes $N_2$/inert storage 58, nitrogen ($N_2$) generation system ("NGS") 62, inert supply line 63, and inert flow line 64. APU 60 includes combustion-based APU 60a and fuel cell-based APU 60b. Combustion-based APU 60a includes exhaust supply line 66 and filter 69, and fuel cell-based APU 60b includes water supply line 61. NGS 62 includes air separation module ("ASM") 68 and ASM port line 70. Inert flow line 64 includes inert flow check valve 72 and pump 74.

Fire suppression system 10 is disposed onboard aircraft 12 and is configured to provide fire suppression and atmosphere inerting to cargo holds 14, among other locations on aircraft 12. Cargo holds 14 are configured to store cargo during aircraft operation. For example, cargo hold 14a can be a forward cargo hold, cargo hold 14b can be a bulk cargo hold, and cargo hold 14c can be an aft cargo hold. Controller 16 communicates with components of fire suppression system 10 via communication network 17. Controller 16 controls the provision of fire suppressing agents from each of HRD module 20, M/LRD module 22, and integrated suppression system 24. In addition, controller 16 controls the opening and closing of shut-off valves 32, mixing valve 30, and metering valve 46, as shown by the connection between controller 16 and distribution line 26. Spray nozzles 36a-36c are disposed in cargo holds 14a-14c, respectively. Distribution line 26 extends through aircraft 12 and is connected to spray nozzles 36 in each cargo hold 14 by supply lines 28a-28c. Supply line 28a extends to spray nozzles 36a, supply line 28b extends to spray nozzles 36b, and supply line 28c extends to spray nozzles 36c. Check valves 34a-34c are disposed on supply lines 28a-28c, respectively, to prevent air from flowing out of the associated cargo hold 14 and into fire suppression system 10. Shut-off valves 32a-32c are each respectively disposed upstream of check valves 34a-34c on supply lines 28a-28c. Shut-off valves 32 are configured to prevent fire suppressant from flowing to any non-burning/healthy cargo hold 14. As such, the maximum amount of fire suppressant can be provided to the compromised cargo hold 14.

HRD supply line 40 extends from HRD vessels 38 to mixing valve 30. HRD supply line 40 provide a flowpath for a fire suppressing agent to flow from HRD vessels 38 to distribution line 26. HRD module 20 is configured to provide a supply of fire suppressing agent, such as Novec-1230, HFC-125, 2-BTP, HFC-236fa, HFC-227ea, and Halon-1301, among others, to cargo holds 14 to provide initial fire suppression. HRD module 20 discharges the supply of fire suppressant in response to a fire being detected. HRD module 20 is configured to start providing the full supply of fire suppressing agent from HRD module 20 to the affected cargo hold 14 in about 1-2 seconds. Typically, the entire HRD supply is fully dispensed. While HRD supply line 40 is described as connected to mixing valve 30, it is understood that HRD supply line 40 can extend directly to distribution line 26 to provide the fire suppressing agent directly to distribution line 26.

M/LRD supply line 44 extends between M/LRD supply vessels 42 and mixing valve 30. M/LRD supply line 44 provides a flowpath for fire suppressant to flow from M/LRD supply vessels 42 to distribution line 26. Metering valve 46 is disposed on M/LRD supply line 44 and is configured to meter the flow of fire suppressing agent out of M/LRD supply line 44. M/LRD module 22 is configured to provide fire suppressing agent to cargo holds 14 to maintain the minimum required fire suppressant concentration after the initial HRD event has ended, to inert atmosphere after the fire is suppressed, and to prevent any secondary fire reignition.

Inert gas supply 50 is disposed upstream of distribution line 26. Inert gas supply 50 is connected to gas-water mixer 52 via inert flow line 64. Inert flow line 64 extends from $N_2$/inert storage 58 and to gas-water mixer 52. $N_2$/inert storage 58 stores pressurized, gaseous nitrogen, and other inert gasses, such as argon (Ar), helium (He), and neon (Ne), among others, for use in fire suppression.

Inert gas supply 50 further collects excess and waste gasses from NGS 62. ASM 68 generates nitrogen-enriched air ("NEA") for use in fuel tank inerting. The NEA is ported to the fuel tanks onboard aircraft 12 to maintain an inert environment in the fuel tanks. The NEA and other inert gasses generated in excess of that required for fuel tank inerting are directed through ASM port line 70 to inert flow line 64. In some examples, the excess NEA and other inert gasses are ported to $N_2$/inert storage 58 via inert supply line 63 for later use.

APU 60 can generate exhaust gasses and/or water effluent for use in fire suppression. APU exhaust supply line 66 extends from the exhaust of combustion-based APU 60a to the cargo compartments 14a-14c. The exhaust of combustion-based APU 60a generates carbon dioxide ($CO_2$) and other exhaust gasses useful for fire suppression. Filter 69 is disposed in exhaust line 66 to treat the exhaust from combustion-based APU 60a to remove contaminants. In this case, the filtered exhaust can be ported directly to the cargo compartments 14a-14c for fire suppression. No exhaust treatment is required for fuel cell-based APU 60b. The exhaust from fuel cell-based APU 60b (i.e., liquid water) can be ported directly to water supply line 56 via supply line 61 and/or sent to an onboard storage tank (not shown) as needed.

Inert flow line 64 receives inert gasses from $N_2$/inert storage 58 and NGS 62. Inert flow line 64 extends to gas-water mixer 52 and is configured to provide the inert gasses to gas-water mixer 52. Inert flow check valve 72 is disposed on inert flow line 64 and is configured to prevent backflow out of gas-water mixer 52. Pump 74 is disposed on inert flow line 64 upstream of check valve 34 and is configured to drive the inert gasses downstream through check valve 34 to gas-water mixer 52. Pump 74 generates sufficient pressure to drive the inert aerosol downstream from gas-water mixer 52 and generate a water mist at spray nozzles 36.

Water supply 48 is disposed upstream of distribution line 26. Water supply 48 is connected to gas-water mixer 52 via water supply line 56. The water is entrained in the inert gasses in gas-water mixer to generate the inert aerosol for fire suppression. Onboard water generators 54a-54n are systems onboard aircraft 12 that generate waste water as a byproduct of normal operation. In one example, onboard water generator 54a is a cabin air conditioning and temperature control system ("CACTCS"). The CACTCS removes water from the air during inlet ram air conditioning. Water supply line 56 receives water from the drain of the CACTCS, and the water can be stored for later use for fire suppression. Onboard water generator 54b can be an environmental control system ("ECS"), which removes moisture from the pressurized and mixed cabin air. Water supply line 56 receives water from the drain of the ECS, and the water can be stored for fire suppression. Both the CACTCS and ECS continuously dehumidify air prior to the air entering the cabin. As such, both the CACTCS and ECS are continuously generating a supply of water that is useful for fire suppression. Other onboard water generators 54 can include the lavatory 54c and galley 54d compartments. The water can be condensed from the moist air in the lavatories and galleys and can be stored for later use in fire suppression. In some examples, grey water is diverted from the lavatory and galley compartments and stored for later use in fire suppression. The water effluent from onboard water generators 54 can be stored in any desired manner. For example, a storage tank (not shown) can be disposed upstream of gas-water mixer 52 and can be configured to provide the stored water to gas-water mixer 52 in response to a command from controller 16. In another example, the water effluent can be stored in the bilge of aircraft 12. The water effluent can then be pumped out of the bilge and to gas-water mixer 52 as needed.

Integrated suppression system 24 utilizes waste effluent from onboard systems to provide additional fire suppression capabilities onboard aircraft 12. Inert gasses from inert gas supply 50 are combined with water from water supply 48 to generate an inert aerosol in gas-water mixer 52. Controller 16 controls the flow of fire suppressing agents from HRD module 20, M/LRD module 22 and integrated suppression system 24. Controller 16 communicates with shut-off valves 32 to shift shut-off valves 32 to the desired open or closed position in response to a fire being detected in one of cargo holds 14. Controller 16 communicates with inert gas supply 50 to control the flow of inert gasses to gas-water mixer 52. Controller 16 also communicates with water supply 48 to control the flow of water to gas-water mixer 52. Mixing valve 30 is configured to modulate the ratio of fire suppressant provided from HRD module 20, integrated suppression system 24, and M/LRD module 22. In some examples, mixing valve 30 is a three-way proportioning valve. Controller 16 controls the position of mixing valve 30 to control the ratio of the fire suppressants from each source.

As an example, the detection of a fire in cargo hold 14a is described in detail. When a fire event is detected, controller 16 initiates fire suppression. Controller 16 commands shut-off valves 32b and 32c to the closed position and shut-off valve 32a to the open position. With shut-off valves 32b and 32c in the closed position, fire suppressant is prevented from flowing to either cargo hold 14b or cargo hold 14c. With shut-off valve 32a in the open position, the fire suppressant is able to flow to cargo hold 14a through supply line 28a.

Initially, controller 16 modulates mixing valve 30 to provide flow from HRD module 20. Controller 16 activates HRD module 20. Fire suppressing agent flows out of HRD vessels 38, through HRD supply line 40 and into distribution line 26. Distribution line 26 provides the fire suppressing agents to supply line 28a, and supply line 28a provides the fire suppressing agents to spray nozzles 36a. The fire suppressing agents are sprayed into cargo hold 14a through spray nozzles 36a to suppress the fire and generate an inert atmosphere. HRD module 20 provides a fire suppressing agent to cargo hold 14a to dilute the air in cargo hold 14a and to extinguish the fire. HRD vessels 38 are typically pressure vessels that start dispensing their supply of fire suppressing agent within 1-2 seconds of activation. Typically, the entire HRD supply is fully dispensed.

To prevent reignition of the fire, controller 16 modulates mixing valve 30 to provide flow from integrated suppression system 24 to provide LRD fire suppression to cargo hold 14a. In some examples, controller 16 modulates mixing valve to provide fire suppression from both integrated suppression system 24 and M/LRD module 22. While fire suppression system 10 is described as including both integrated suppression system 24 and M/LRD module 22, it is understood that the integrated suppression system 24 provides sufficient LRD capabilities. M/LRD module 22 is configured to provide additional metered/LRD capabilities where necessary.

Pump 74 drives inert gas from at least one of NGS 62 and $N_2$/inert storage 58 downstream to gas-water mixer 52. While pump 74 is described as driving the inert gas to gas-water mixer 52, it is understood that $N_2$/inert storage 58 can be pressurized to provide the stored nitrogen to gas-water mixer 52 and downstream into distribution line 26. Water supply line 56 provides collected water to gas-water mixer 52. At gas-water mixer 52, the collected water is entrained in the inert gas to generate the inert aerosol. The inert aerosol is driven downstream through mixing valve 30 and into distribution line 26. The inert aerosol flows through distribution line 26 to supply line 28a. The inert aerosol is dispensed into cargo hold 14a through spray nozzles 36a. The inert aerosol provides a spray of small, highly penetrating fluid particles that provide both cooling and inerting in cargo hold 14a, thereby preventing reignition of the fire.

As discussed above, onboard water generators 54, such as the CACTCS and ECS, continuously generate water effluent as a byproduct of dehumidification. As such, a fresh supply of water can continuously be provided to gas-water mixer 52 to generate additional inert aerosol. In addition, NGS 62 can continuously provide additional $N_2$ and other inert gases, to gas-water mixer 52 to generate additional inert aerosol. As such, additional inert aerosol can be continuously generated during flight to provide additional fire suppressing capabilities.

Integrated suppression system 24 provides significant advantages. Integrated suppression system 24 utilizes waste effluents, both liquid and gaseous, from various on-board systems to generate the inert aerosol utilized for fire suppression. As such, the waste effluents are repurposed, reducing the waste generated by aircraft 12. In addition, utilizing the waste effluents reduces the need for additional on-board systems that are dedicated solely to fire suppression, thereby saving weight and space on aircraft 12. For example, with integrated suppression system 24 on aircraft 12, some M/LRD supply vessels 42 can be eliminated from aircraft 12. In some examples, M/LRD module 22 can be eliminated from aircraft 12, such that integrated suppression system 24 provides full metered/LRD capabilities, providing a cost and weight savings. Inert gasses that are typically vented overboard by ASM 68, such as Ar, He, and Ne, among others, are instead captured and utilized to generate the inert aerosol. NEA in excess of that required for fuel tank inerting is also provided to integrated suppression system 24 to generate the inert aerosol. Utilizing inert gasses and waste water generated by onboard systems to generate a fire suppressing inert aerosol also reduces the use of environmentally harmful greenhouse gasses that are typically used in fire suppression, such as Halon-1301.

FIG. 2 is a flow chart depicting method 100 of fire suppression for an aircraft, such as aircraft 12 (FIG. 1). In step 102, conditioned water is collected from at least one onboard water generating system, such as the CACTCS, ECS, lavatory, and galley, among others. In some examples, the conditioned water is collected in a water supply line, such as water supply line 56 (FIG. 1) until needed. In other examples, the conditioned water is stored in a storage tank dedicated to the fire suppression system. In yet another example, the conditioned water is stored in the bilge and is pumped out of the bilge when needed. In step 104, the conditioned water is flowed to a gas-water mixer, such as gas-water mixer 52 (FIG. 1).

In step 106, an inert gas is flowing to the gas-water mixer via an inert gas line, such as inert flow line 64 (FIG. 1), and the inert gas and water are mixed in the gas-water mixer to generate an inert aerosol. For example, $N_2$ and other inert gasses can be provided to the gas-water mixer from onboard $N_2$/inert storage, such as $N_2$/inert storage 58 (FIG. 1). In other examples, $N_2$ and other inert gasses in excess of that required for fuel tank inerting can be ported to the inert flow line from the onboard ASM, such as ASM 68 (FIG. 1).

In step 108, the inert aerosol is fed to a fire suppressing distribution network, such as distribution line 26 (FIG. 1), supply lines 28 (FIG. 1), and spray nozzles 36 (FIG. 1), and sprayed into an area of the aircraft requiring fire suppression. For example, a controller, such as controller 16 (FIG. 1) can activate a pump, such as pump 74 (FIG. 1), and adjust relevant valves, such as metering valve 46 (FIG. 1) and shut-off valves 32 (FIG. 1), to drive the inert aerosol downstream though the distribution network from the gas-water mixer and to the affected area of the aircraft, such as cargo holds 14 (FIG. 1). The controller controls the valves to direct the inert gas-water inert aerosol to the desired area of the aircraft, and the inert gas-water inert aerosol is sprayed out of the spray nozzles.

Discussion of Possible Embodiments

The following are non-exclusive descriptions of possible embodiments of the present invention.

A fire suppression system includes a water supply system, a gas generation system, a gas-water mixer disposed downstream of the water supply system and the gas generation system, and a fire suppressant distribution network disposed downstream of the gas-water mixer. The water supply system is configured to collect conditioned water effluent from at least one onboard water source. The gas generation system is configured to provide a supply of inert gas to an inert flow line. The gas-water mixer is configured to receive the conditioned water effluent and the supply of inert gas and to generate an inert aerosol. The fire suppressant distribution network is configured to provide the inert aerosol to areas of an aircraft.

The fire suppression system of the preceding paragraph can optionally include, additionally and/or alternatively, any one or more of the following features, configurations and/or additional components:

The at least one onboard water source comprises at least one of a cabin air conditioning and temperature control system and an environmental control system.

The onboard water source further comprises at least one of an aircraft lavatory and an aircraft galley.

At least a portion of the conditioned water includes grey water.

The gas generation system comprises at least one storage tank connected to the inert flow line.

The gas generation system further comprises an air separation module configured to generate nitrogen-enriched air and to provide a first portion of the nitrogen-enriched air to a fuel tank for fuel tank inerting and a second portion of the nitrogen-enriched air to the inert flow line for generating the inert aerosol.

A combustion-based auxiliary power unit configured to provide APU exhaust gases to the cargo compartment.

A filter disposed on an exhaust supply line extending between the combustion-based auxiliary power unit and the cargo compartment, the filter configured to remove contaminants from the APU exhaust gases.

A fuel cell-based auxiliary power unit configured to provide APU water effluent to the gas-water mixer.

A high-rate discharge module connected to the fire suppressant distribution network.

A metered/low-rate discharge fire suppressant module connected to the fire suppressant distribution network.

A mixing valve disposed at an intersection of the inert flow line and the fire suppressant distribution network, the mixing valve configured to control a fire suppressant ratio between the high-rate discharge module and the inert gas-water mixture within the fire suppressant distribution network.

A method of providing fire suppression capabilities for an aircraft includes collecting conditioned water from at least one onboard water generating system of the aircraft; directing the conditioned water to an inert gas-water mixer; directing an inert gas to the inert gas-water mixer via an inert flow line, thereby generating an inert aerosol; and feeding the inert aerosol to a fire suppressant distribution network and directing the inert aerosol to an affected area of the aircraft for fire suppression.

The method of the preceding paragraph can optionally include, additionally and/or alternatively, any one or more of the following features, configurations and/or additional components:

Generating nitrogen-enriched air for fuel tank inerting with an air separation module; and directing a portion of the nitrogen-enriched air from the air separation module to the inert flow line.

Capturing an APU exhaust from a combustion-based auxiliary power unit and directing the exhaust to the affected area of the aircraft.

Filtering the APU exhaust prior to directing the APU exhaust to the affected area of the aircraft.

Capturing an APU water effluent from a fuel cell-based auxiliary power unit and directing the APU water effluent to the inert gas-water mixer.

The step of collecting conditioned water from at least one onboard water generating system of the aircraft includes removing water from air during air conditioning; and providing the removed water to the gas-water mixer to generate the inert aerosol.

The onboard water generating system comprises at least one of a cabin air conditioning and temperature control unit and an environmental control system.

The step of collecting conditioned water from at least one onboard water generating system of the aircraft includes collecting grey water from at least one of an aircraft lavatory and an aircraft galley; and providing the collected grey water to the gas-water mixer to generate the inert aerosol.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fire suppression system comprising: at least one onboard water source configured to generate water effluent; at least one storage tank configured to provide a supply of inert gas to an inert flow line; a gas-water mixer disposed downstream of the at least one water source and the at least one storage tank, the gas-water mixer configured to receive the water effluent and the supply of inert gas and to generate an inert aerosol; and a fire suppressant distribution network disposed downstream of the gas-water mixer, the fire suppressant distribution network configured to provide the inert aerosol to areas of an aircraft; a high-rate discharge vessel connected to the fire suppressant distribution network; a metered and low-rate discharge vessel connected to the fire suppressant distribution network; a mixing valve disposed at an intersection of the inert flow line and the fire suppressant distribution network, wherein the metered and low-rate discharge vessel and the gas-water mixer are fluidly connected to the mixing valve such that the mixing valve can control a fire suppressant ratio between flows from each of the gas-water mixer and the metered and low-rate discharge vessel to the fire suppressant distribution network, and wherein the high-rate discharge vessel is configured to discharge a higher rate than the metered and low-rate discharge vessel.

2. The fire suppression system of claim 1, wherein the at least one onboard water source comprises at least one of a cabin air conditioning and temperature control system and an environmental control system.

3. The fire suppression system of claim 2, wherein the at least one onboard water source further comprises at least one of an aircraft lavatory and an aircraft galley.

4. The fire suppression system of claim 3, wherein at least a portion of the water effluent includes grey water.

5. The fire suppression system of claim 1, further comprising an air separation module configured to generate nitrogen-enriched air and to provide a first portion of the nitrogen-enriched air to a fuel tank for fuel tank inerting and a second portion of the nitrogen-enriched air to the inert flow line for generating the inert aerosol.

6. The fire suppression system of claim 1, further comprising:
a combustion-based auxiliary power unit configured to provide exhaust gases of the combustion-based auxiliary power unit to a cargo compartment.

7. The fire suppression system of claim 6, further comprising a filter disposed on an exhaust supply line extending between the combustion-based auxiliary power unit and the cargo compartment, the filter configured to remove contaminants from the exhaust gases of the combustion-based auxiliary power unit.

8. The fire suppression system of claim 1, further comprising:
a fuel cell-based auxiliary power unit configured to provide water effluent of the fuel cell-based auxiliary power unit to the gas-water mixer.

9. The fire suppression system of claim 1, wherein the high-rate discharge vessel is fluidly connected to the mixing valve, and wherein the mixing valve is configured to control a fire suppressant ratio between the high-rate discharge module the gas water mixer, and the metered and low-rate discharge vessel within the fire suppressant distribution network.

10. A method of providing fire suppression capabilities for an aircraft, the method comprising: collecting conditioned water from at least one onboard water source configured to generate water effluent; directing the conditioned water from the water supply system to an inert gas-water mixer disposed downstream of the water supply system; directing an inert gas from at least one storage tank to the inert gas-water mixer via an inert flow line; generating an inert aerosol from the conditioned water and the inert gas at the gas- water mixer; directing the inert aerosol from the gas-water mixer to a mixing valve; directing fire suppressant from a high-rate discharge vessel a first suppressant distribution network; directing fire suppressant from a metered and low-rate discharge vessel to the mixing valve; controlling a fire suppressant ratio between the inert aerosol from the gas-water mixer and the fire suppressant from the metered and low-rate discharge vessel provided to a fire suppressant distribution network disposed downstream of the gas-water mixer with the mixing valve; and directing the inert aerosol through the fire suppressant distribution network and to an affected area of the aircraft for fire suppression, and wherein the high-rate discharge vessel is configured to discharge a higher rate than the metered and low-rate discharge vessel.

11. The method of claim 10, further comprising:
generating nitrogen-enriched air for fuel tank inerting; and
directing a portion of the nitrogen-enriched air to the inert flow line.

12. The method of claim 10, further comprising:
capturing an APU exhaust from a combustion-based auxiliary power unit; and
directing the APU exhaust to the affected area of the aircraft.

13. The method of claim 12, further comprising:
filtering the APU exhaust prior to directing the APU exhaust to the affected area of the aircraft.

14. The method of claim 10, further comprising:
capturing an APU water effluent from a fuel cell-based auxiliary power unit; and
directing the APU water effluent to the inert gas-water mixer.

15. The method of claim 10, wherein the step of collecting conditioned water from at least one onboard water generating system of the aircraft comprises:
removing water from air during air conditioning; and
providing the removed water to the gas-water mixer to generate the inert aerosol.

16. The method of claim 15, wherein the onboard water generating system comprises at least one of a cabin air conditioning and temperature control unit and an environmental control system.

17. The method of claim 10, wherein the step of collecting conditioned water from at least one onboard water generating system of the aircraft further comprises:
collecting grey water from at least one of an aircraft lavatory and an aircraft galley; and
providing the collected grey water to the gas-water mixer to generate the inert aerosol.

* * * * *